(12) United States Patent
Huo

(10) Patent No.: US 7,855,762 B2
(45) Date of Patent: Dec. 21, 2010

(54) LIQUID CRYSTAL MODULE

(75) Inventor: Dong Im Huo, Gyenongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 216 days.

(21) Appl. No.: 12/292,279

(22) Filed: Nov. 14, 2008

(65) Prior Publication Data

US 2009/0073341 A1    Mar. 19, 2009

Related U.S. Application Data

(62) Division of application No. 11/116,202, filed on Apr. 28, 2005, now Pat. No. 7,463,313.

(30) Foreign Application Priority Data

Apr. 29, 2004    (KR) .................. 10-2004-0029874

(51) Int. Cl.
G02F 1/1333    (2006.01)
G02F 1/1335    (2006.01)

(52) U.S. Cl. .............. 349/58; 349/62; 349/64; 349/67; 349/98; 345/7; 345/87

(58) Field of Classification Search ............ 349/58, 349/62–64; 345/7, 87
See application file for complete search history.

(56) References Cited

U.S. PATENT DOCUMENTS

| | | | |
|---|---|---|---|
| 6,867,825 B2 * | 3/2005 | Kanatsu et al. ............ | 349/60 |
| 6,919,937 B2 | 7/2005 | Kim et al. | |
| 7,027,111 B2 | 4/2006 | Fukayama et al. | |
| 7,154,571 B2 | 12/2006 | Fukayama et al. | |
| 7,283,184 B2 | 10/2007 | Kim et al. | |
| 7,722,242 B2 * | 5/2010 | Chen et al. ................ | 362/634 |
| 2003/0058380 A1 | 3/2003 | Kim et al. | |
| 2008/0129918 A1 | 6/2008 | Kim et al. | |
| 2010/0097524 A1 * | 4/2010 | Kuromizu ................. | 348/553 |

FOREIGN PATENT DOCUMENTS

| | | |
|---|---|---|
| KR | 10-1999-008719 | 2/1999 |
| KR | 10-200100087456 | 9/2001 |
| KR | 10-2004-0032162 | 4/2004 |

* cited by examiner

Primary Examiner—Julie-Huyen L Ngo
(74) Attorney, Agent, or Firm—McKenna Long & Aldridge

(57) ABSTRACT

A liquid crystal module includes: a first support part for receiving and affixing ends of a plurality of lamps; an optical plate disposed above an upper surface of the first support part; a second support part for retaining the optical plate and having a lower surface above the optical plate, wherein the upper surface of the first support part or the lower surface of the second support part has a recessed portion contacting the optical plate such that a gap is formed between the optical plate, and one of the upper surface of the first support part and the lower surface of the second support part.

7 Claims, 6 Drawing Sheets

LIQUID CRYSTAL MODULE

This application is a divisional of prior application Ser. No. 11/116,202, filed Apr. 28, 2005, now U.S. Pat. No. 7,463,313, and claims the benefit of Korean Patent Application No. 2004-29874, filed in Korea on Apr. 29, 2004, which is hereby incorporated by reference for all purposes as if fully set forth herein.

BACKGROUND OF THE INVENTION

1. Field of the Invention

The present invention relates to a liquid crystal display, and more particularly, to a liquid crystal module for a liquid crystal display that can minimize noise due to structural friction.

2. Description of the Related Art

A cathode ray tube (CRT) is a type of display generally used as a monitor. For example, a CRT can be used in a television, a meter, an information terminal or the like. However, the weight of a CRT can not be reduced to be light and the profile can not be reduced to be thin because of the use of a bulky electron gun that has to be in a glass tube.

An liquid crystal display (LCD) is replacing the CRT because an LCD has the advantages of a slim profile, light weight and low power consumption has been actively developed. The development of the LCD has recently progressed to such a degree that it can sufficiently perform a role as a flat panel display. As a result, LCDs are being used as monitors in laptop computers, desktop computers, outdoor large-sized screens above 30 inches, and flat panel wall-mounted TVs. The demand for such products continues to increase.

An LCD is a light-receiving device that displays an image by controlling an amount of light transmitted from one side to the other side of the LCD. Thus, the LCD needs a separate light source, such as a backlight assembly, to project light onto one side of a liquid crystal panel of an LCD such that an image can be displayed on the other side of the liquid crystal panel.

Backlight assemblies are generally classified into an edge type and a direct type according to the position of the light source with respect to a display surface. The direct type backlight assembly provides light in a direct path to the liquid crystal panel and an edge type backlight assembly provides light in an indirect path with a light guide plate to the liquid crystal panel. The direct type backlight assembly has the advantages of high light usage efficiency as well as easy attachment to a liquid crystal panel. In addition, the direct type backlight assembly and can be used with a liquid crystal panel of any size. A direct type backlight assembly is widely used in large-sized LCDs having a size greater than 30 inches.

The direct type backlight assembly does not need a light guide plate for converting light of a lamp at the edge of a liquid crystal panel into a surface light like an edge type backlight assembly. Instead, the direct type backlight assembly includes a plurality of lamps disposed below the display surface of the liquid crystal panel. Further, the direct type backlight assembly also includes a reflection sheet for reflecting light from the lamps toward the display surface to efficiently use all of the light from the lamps and a diffuser plate for scattering light so as to uniformly distribute light across the display surface of the liquid crystal panel.

FIG. 1 is a perspective view of an edge of a liquid crystal module employing a direct type backlight assembly according to the related art. More particularly, FIG. 1 shows the edge of a liquid crystal module before a guide panel is attached. FIG. 2 is a cross-sectional view taken along line I-I' of FIG. 1 and includes a guide panel.

Referring to FIGS. 1 and 2, the related art liquid crystal module includes a support side 12 for receiving and affixing ends of a plurality of lamps 10, a diffuser plate 14 with a side in contact with an upper surface of the support side 12, and a guide panel 18 affixing the diffuser plate 14 to the support side 12. A liquid crystal panel (not shown) is disposed on the diffuser plate 14 when the liquid crystal module is in use. A reflection sheet 16 for reflecting the light projected by the lamps 10 toward a liquid crystal panel (not shown) is disposed below the lamps 10. Further, a plurality of optical sheets (not shown) may be inserted between the diffuser plate 14 and the liquid crystal panel (not shown).

The guide panel 18 and the support side 12 are coupled to each other by a coupling means, such as a bolt 19 or the like. Thus, the diffuser plate 14 is affixed to the support side 12. A continuous face of the support side 12 contacts the diffuser plate 14 at an area "A". However, the related art liquid crystal module has a drawback in that its components expand and move due to changes in temperature. This expansion or movement can cause noise because of friction between the components.

When a power is applied to the liquid crystal module or an applied power is turned off, heat is generated or cooling begins, thereby causing the components to expand or contract. However, some of the components expand faster than other components and some of the components contract slower than other components. Thus, movement occurs between adjacent components having different rates of expansion or contraction. If there is a friction between components having different rates of expansion or contraction, a frictional noise can occur.

For example, when a power is applied to the liquid crystal module shown in FIGS. 1 and 2, the diffuser plate 14 is expands due to the increased temperature, so that a movement can occur in a direction toward the support side 12 in, for example, an X-axis direction across the upper surface of the support side 12. Since the guide panel 18 is affixed by the bolt 19, a force is applied down onto the diffuser plate 14 by the bolt 19 such that diffuser plate applies a force down, for example, in a Z-axis direction onto the support side 12. Thus, a noise is generated due to friction between the diffuser plate 14 and the support side 12 when the diffuser plate 14 expands.

FIG. 3 is a perspective view of the top and side surfaces of the support side shown in FIGS. 1 and 2. As shown in FIG. 3, the support side 12 according to the related art has a top surface in which a portion "A" contacts the diffuser plate 14 in a continuous strip. A frictional noise is generated because the diffuser plate 14 is held down against the support side 12 across the entire surface of the continuous strip of portion "A" when the diffuser plate 14 moves with respect to the support side 12 due to expansion or contraction of the diffuser plate 14 resulting from temperature changes.

SUMMARY OF THE INVENTION

Accordingly, the present invention is directed to a liquid crystal module that substantially obviates one or more problems due to limitations and disadvantages of the related art.

An object of the present invention is to provide a liquid crystal module that can prevent a noise from being generated due to expansion or contraction of an optical plate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a liquid crystal module including: a first support part for receiving and affixing ends of a plurality of lamps; an optical plate disposed above an upper surface of the first support part; a second support part for retaining the optical plate and having a lower surface above the optical plate, wherein the upper surface of the first support part or the lower surface of the second support part has a recessed portion contacting the optical plate such that a gap is formed between the optical plate, and one of the upper surface of the first support part and the lower surface of the second support part.

In another aspect of the present invention, there is provided a liquid crystal module including: a first support part for receiving and affixing ends of a plurality of lamps; an optical plate contacting an upper surface of the first support part; a second support part affixed to the first support part for retaining the optical plate, wherein the upper surface of the first support part has a series of recessed portions with ribs between the recessed portions such that the ribs contact a lower surface of the optical plate.

In another aspect of the present invention, there is provided a liquid crystal module including: a first support part for receiving and affixing ends of a plurality of lamps; an optical plate contacting an upper surface of the first support part; a second support part affixed to the first support part for retaining the optical plate, wherein an upper surface of the first support part has a series of recessed portions with ribs between the recessed portions such that the ribs are above an upper surface of the optical plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings.

Figure 1:
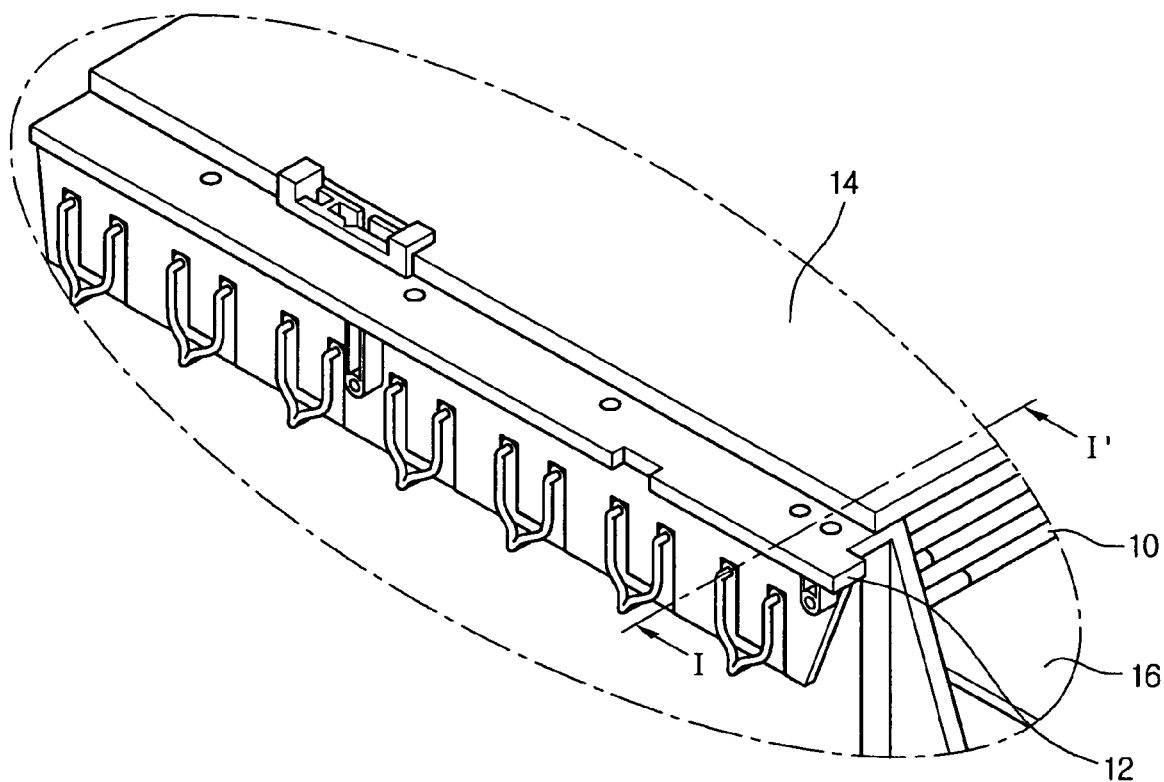
FIG. 1 is a perspective view of an edge of a liquid crystal module employing a direct type backlight assembly according to the related art.
Figure 2:
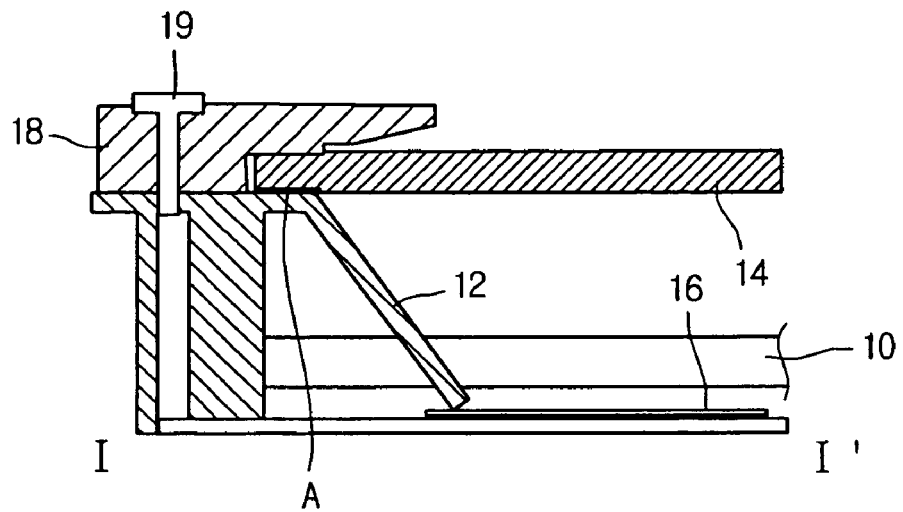
FIG. 2 is a cross-sectional view taken along line I-I' of the liquid crystal module shown in FIG. 1 that includes a guide panel.
Figure 3:
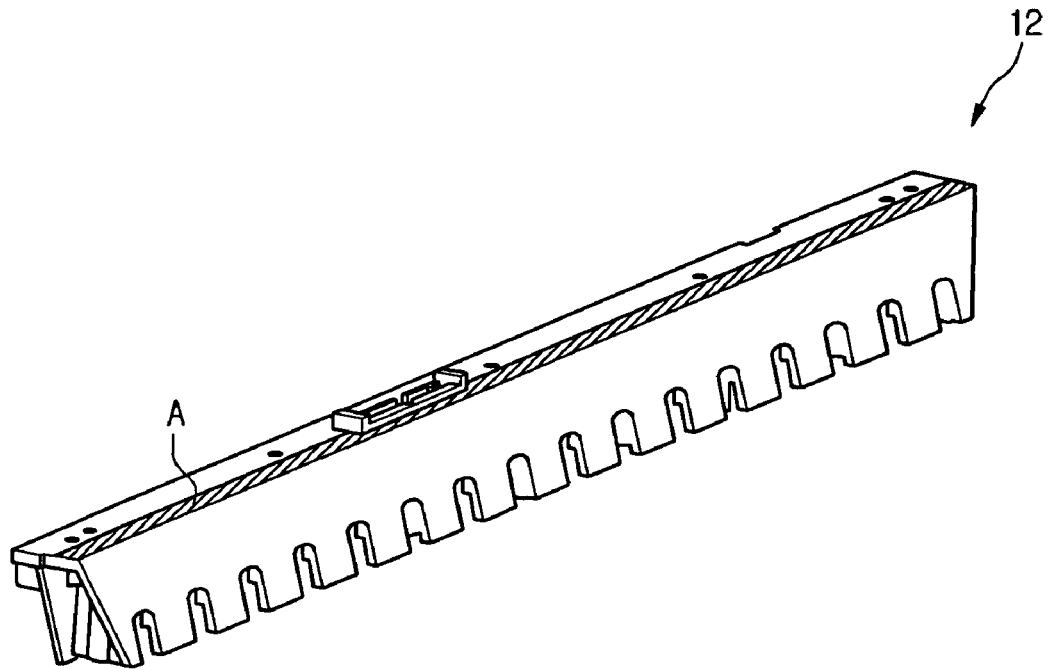
FIG. 3 is a perspective view of the top and side surfaces of the support side shown in FIGS. 1 and 2.
Figure 4:
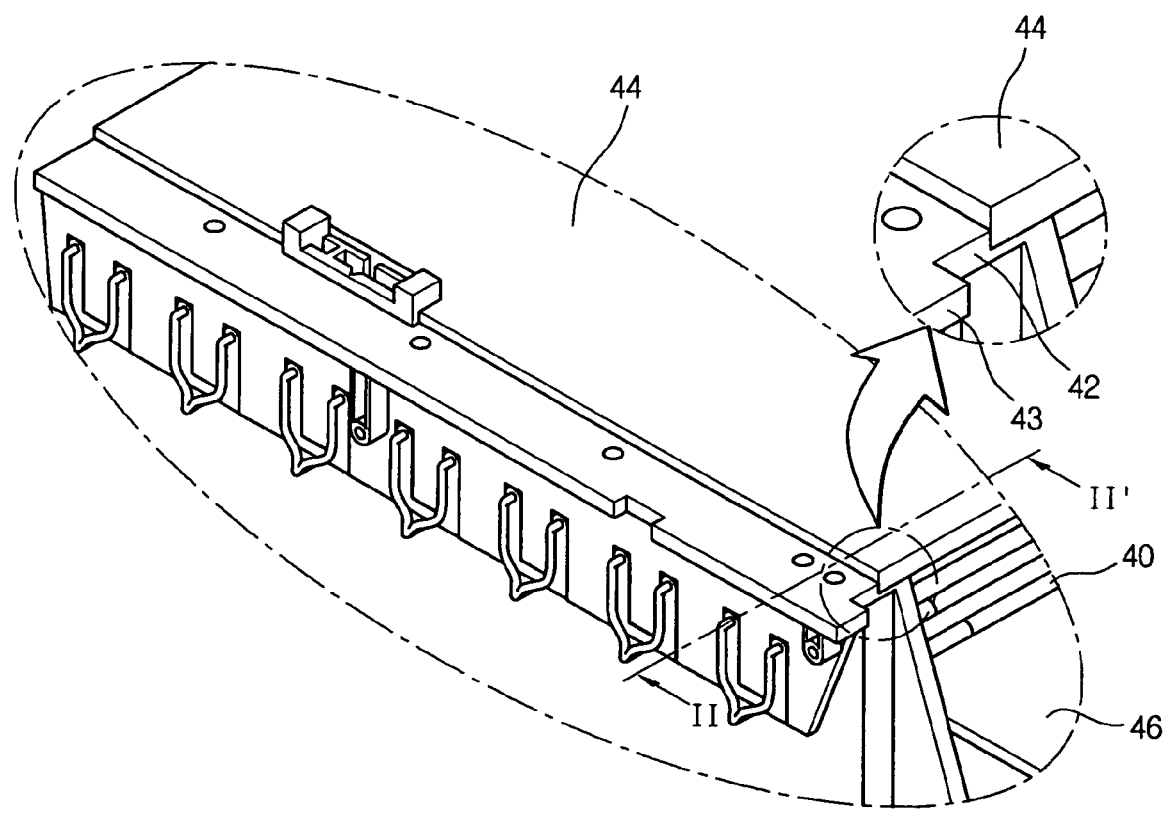
FIG. 4 is a perspective view of an edge of a first support part for a liquid crystal module employing a direct type backlight assembly according to an exemplary embodiment of the present invention.
Figure 5:
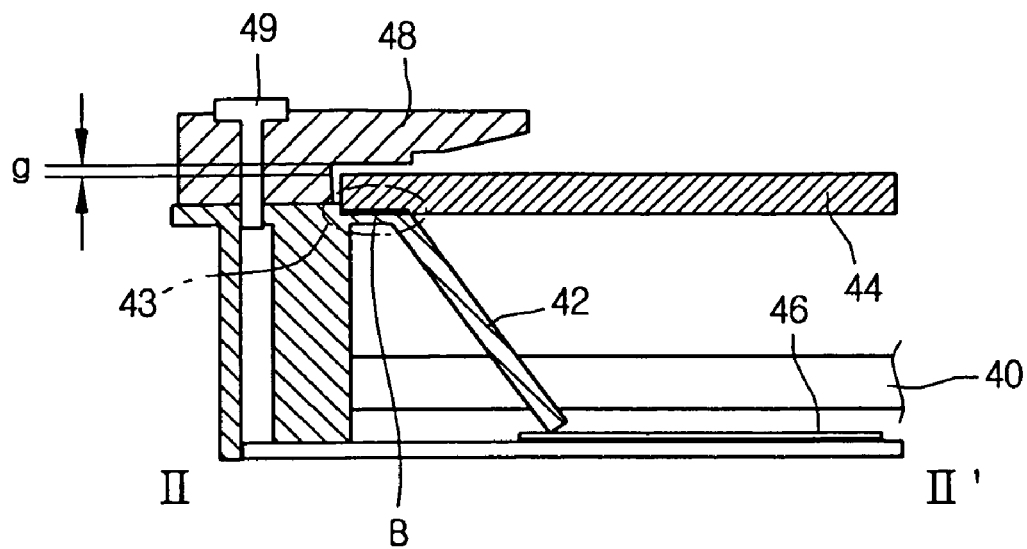
FIG. 5 is a cross-sectional view taken along line II-II' of the liquid crystal module shown in FIG. 4 that includes a second support part.

FIG. 4 is a perspective view of an edge of first support part for a liquid crystal module employing a direct type backlight assembly according to an exemplary embodiment of the present invention. FIG. 4 also shows the liquid crystal module before a second support part is affixed to the first support part 42. FIG. 5 is a cross-sectional view taken along line II-II' of the liquid crystal module shown in FIG. 4 that includes a second support part.

Referring to FIGS. 4 and 5, the liquid crystal module according to an exemplary embodiment of the present invention includes a first support part 42 for receiving and affixing ends of a plurality of lamps 40. An optical plate 44 with a lower surface contacts an upper surface of the first support part 42. A second support part 48 is used to retain the optical plate 44 by affixing the second support part 48 to the first support part 42. A liquid crystal panel (not shown) can be disposed on the optical plate 44.

The first support part 42 has an upper surface with recessed portion 43. The optical plate 44 contacts the upper surface at the recessed portion 43 such that a predetermined gap 'g' is formed between the optical plate 44 and the first support part 42 or the second support part 48. Since the first support part 42 has an upper surface with a recessed portion 43 contacting the optical plate 44, the gap 'g' is formed between the optical plate 44 and the second support part 48 and accordingly the optical plate 44 is not forced against the upper surface of the first support part 42 or against the lower surface of and second support part 48.

If the optical plate 44 expands due to an increase in temperature in liquid crystal module described above, a frictional noise is not generated between the optical plate 44 and either the first support part 42 or the second support part 48. This is because the lower surface of the optical plate 44 is not held against a face or upper surface of the first support part 42, or the upper surface of the optical plate 44 is not held against a face or lower surface of the second support part 48. Instead, the optical plate 44 is loosely encapsulated by the first support part 42 and the second support part 48 with a gap 'g' such that less friction is generated between the lower surface of the optical plate 44 and upper surface of the first support part 42 as well as between the upper surface of the optical plate 44 and the lower surface of the second support part 48, so that a frictional noise is not generated.

As shown in FIGS. 4 and 5. A region "B" of the upper surface for the first support part 42 contacting the optical plate 44 is intagliated or formed to have a recessed portion. Although the first support part 42 is coupled with and affixed to the second support part 48, a gap "g" is kept between the optical plate 44 and the first support part 42 or the second support part 48. Thus, when power is applied to the liquid crystal module or an applied power is turned off, although the optical plate 44 expands or contracts due to an increase or a decrease in temperature, friction between upper and lower sides of the optical plate is reduced such that noise generation caused by friction is prevented.

The optical plate 44 may be a diffuser plate. The first support part and second support part may be a support side and a guide panel, respectively. Also, a reflection sheet 46 for reflecting the light from the lamps 40 toward the display surface is further provided below the lamps 40. In addition, a plurality of optical sheets may be inserted between the optical plate 44 and the liquid crystal panel.

The first support part 42 may be coupled with the second support part 48 by a coupler, such as a bolt 49 shown in FIG. 5. The coupling between the first support part 42 and the second support part 48 does not necessarily have to be performed by a coupler. Alternatively, the first and second support parts 42 and 48 may be formed integrally with each other.

Figure 6:
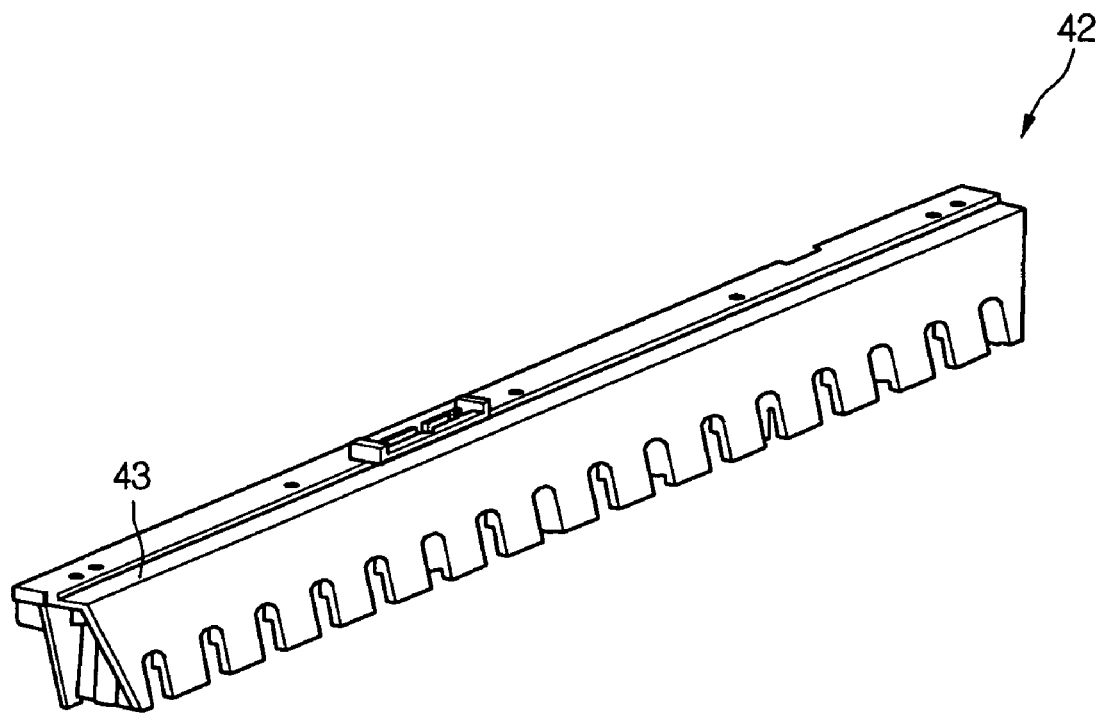
FIG. 6 is a perspective view of the top and side surfaces of the first support part shown in FIGS. 4 and 5.

FIG. 6 is a perspective view of the top and side surfaces of the first support part shown in FIGS. 4 and 5. The shape of the first support part 42 will be described in more detail in reference to FIG. 6. The first support part 42, as shown in FIG. 6 has an upper surface with a recessed portion 43 contacting the optical plate 44. The recessed portion is formed by partially removing a continuous strip of the first support part 42 that would otherwise cause friction between the optical plate 44 and the first support part 42. In other words, the upper surface of the first support part 42 is intaglioed or recessed to form a recessed portion 43. Accordingly, when the first support part 42 is coupled with the second support part 48, a gap "g" is formed between the optical plate 44 and one of the first and second support parts 42 and 48. Although the optical plate 44 expands or contracts due to an increase or a decrease in temperature, friction between the optical plate 44 and the support parts adjacent thereto is minimized so as to prevent frictional noise generation.

The above exemplary embodiment shows a recessed portion 43 just in the first support part 42. A recessed portion can also be formed in the lower surface of the second support part 48 contacting the optical plate 44 so that both the first support part 42 and the second support part 48 have a recessed portion. In another alternative, a recessed portion 43 can be formed just in the second support part 48.

Figure 7:
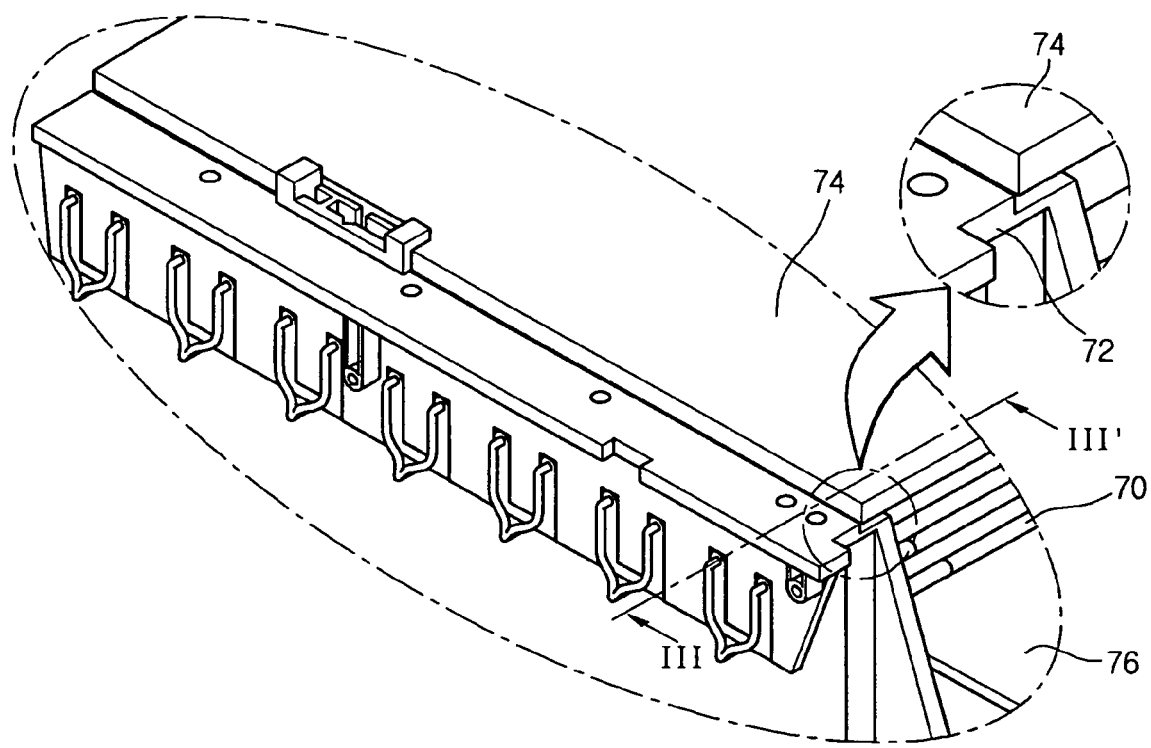
FIG. 7 is a perspective view of an edge of a first support part for a liquid crystal module employing a direct type backlight assembly according to another exemplary embodiment of the present invention.
Figure 8:
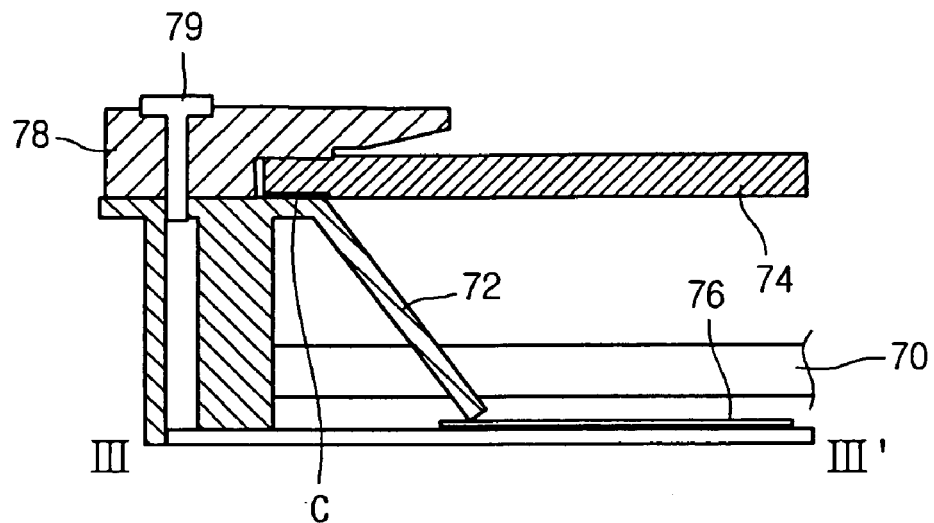
FIG. 8 is a cross-sectional view taken along the line III-III' of FIG. 7 and includes a second support part.

FIG. 7 is a perspective view of an edge of a first support part for a liquid crystal module employing a direct type backlight assembly according to another exemplary embodiment of the present invention. More particularly, FIG. 7 partially shows the liquid crystal module before a second support part is assembled. FIG. 8 is a cross-sectional view taken along line III-III' of the liquid crystal module shown in FIG. 7 that includes a second support part.

Referring to FIGS. 7 and 8, the liquid crystal module according to another exemplary embodiment of the present invention includes a first support part 72 for receiving and affixing ends of a plurality of lamps 70, an optical plate 74 having lower side in contact with an upper surface of the first support part 72, and a second support part 78. The first support part 72 and the second support part 78 retain the optical plate 74. A liquid crystal panel (not shown) can be disposed on the optical plate 74.

To decrease a contact area between the lower side of the optical plate 74, and the upper surface of the first support part 72 or the lower surface of the second support part 78, the upper surface of the first support part 72 contacts the optical plate 74 with a rib 75 between each of the recessed portions 73. The recessed portions 73 can be the same size such that the ribs 75 amongst the series of recessed portions 73 can be at a constant interval.

Because the first support part 72 contacts the lower surface of the optical plate 44 with ribs 75 formed between recessed portions 73, the lower surface of the optical plate is in contact with the first support part 72 across the surfaces of the ribs 75. The contact area of the first support part 72 with the optical plate is small. Thus, in the case of a first support part having a series of ribs in contact with the optical plate, when the optical plate 74 expands or contracts due to an increase or decrease in temperature, less frictional noise is generated.

The optical plate 74 may be a diffuser plate, and the first and second support parts 72 and 78 may be a support side and a guide panel, respectively. Also, a reflection sheet 76 for reflecting the light from the plurality of lamps 70 toward the display surface is provided below the lamps 70. A plurality of optical sheets (not shown) can be inserted between the optical plate 74 and the liquid crystal panel.

The first support part 72 may be coupled with the second support part 78 by a coupler, such as a bolt 49 shown in FIG. 8. The coupling between the first support part 72 and the second support part 78 does not necessarily have to be done by the coupler. Alternatively, the first and second support parts 72 and 78 can be formed integrally with each other as a single body.

Figure 9:
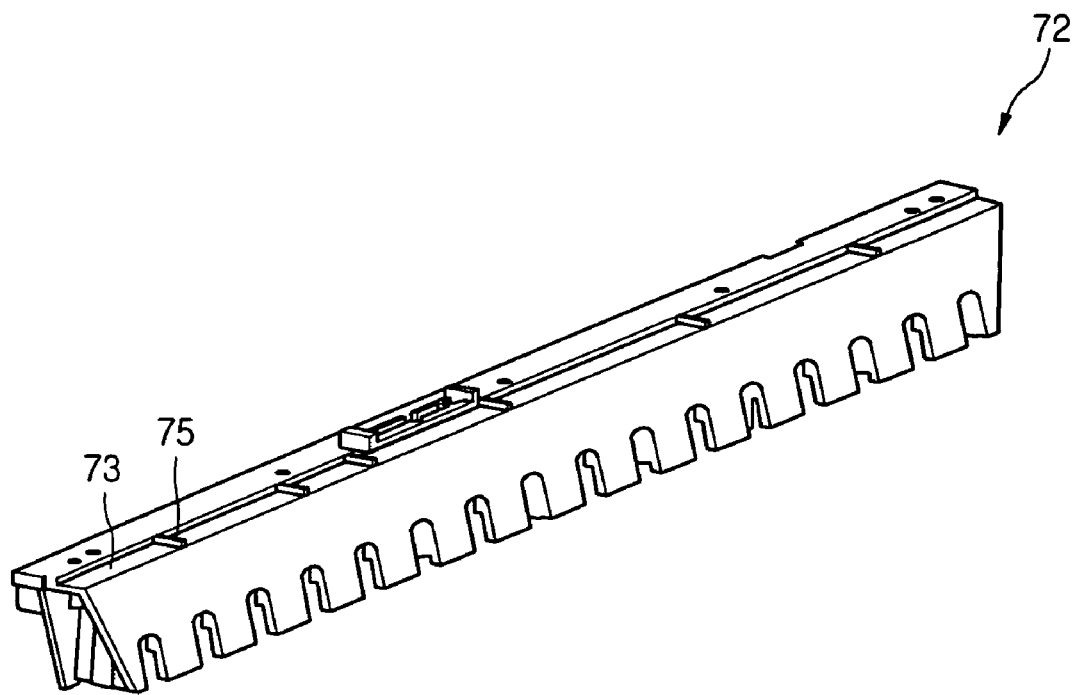
FIG. 9 is a perspective view of the top and side surfaces of the first support part shown in FIGS. 7 and 8.

FIG. 9 is a perspective view of the top and side surfaces of the first support part shown in FIGS. 7 and 8. The shape of the first support part 72 will be described in more detail with reference to FIG. 9. The first support part 72 has the series of recessed portions 73 and ribs 75 disposed amongst the series of recessed portions 73. The series of ribs 75 of the first support part 72 contact the optical plate. In other words, the optical plate 74 is in contact with the first support part 72 at several points with a small contact area rather across a long strip of the top surface of the first support part 72. Accordingly, although the optical plate 74 expands or contracts due to an increase or a decrease in temperature, frictional noise is reduced by a considerable degree because of the small contact area distributed across several points of contact.

When power is applied to the liquid crystal module according to embodiments of the present invention and expansion occurs due to an increase in temperature, friction between the elements is minimized such that frictional noise is prevented from being generated. Further, when power is turned-off to the liquid crystal module according to embodiments of the present invention and contraction occurs due to a decrease in temperature, friction between the elements is minimized such that frictional noise is prevented from being generated.

The above exemplary embodiment shows ribs 75 just in the first support part 72. Ribs can also be formed in the second support part 78 contacting the optical plate 74 so that both the first support part 72 and the second support part 78 each have ribs. In another alternative, ribs 75 can be formed just in the second support part 78.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal module comprising:
 a first support part for receiving and affixing ends of a plurality of lamps;
 an optical plate contacting an upper surface of the first support part;
 a second support part affixed to the first support part for retaining the optical plate, wherein the upper surface of the first support part has a series of recessed portions with ribs between the recessed portions such that the ribs contact a lower surface of the optical plate.

2. The liquid crystal module according to claim 1, wherein the optical plate is a diffuser plate and the first and second support parts are respectively a support side and a guide panel.

3. The liquid crystal module according to claim 1, further comprising:
   a reflection sheet disposed below the plurality of lamps, for reflecting light from the plurality of lamps toward a display surface; and
   a plurality of optical sheets disposed between the optical plate and the liquid crystal panel.

4. The liquid crystal module according to claim 1, wherein the first support part and the second support part are coupled to each other by a coupler.

5. The liquid crystal module according to claim 1, wherein the first support part and the second support part are formed integrally with each other as a single body.

6. The liquid crystal module according to claim 1, wherein the recessed potions are the same size such that the ribs are at a constant interval.

7. The liquid crystal module according to claim 1, wherein a lower surface of the second support part has a series of recessed portions with ribs between the recessed portions such that the ribs contact an upper surface of the optical plate.

* * * * *